United States Patent
Zhang et al.

(10) Patent No.: US 9,256,408 B2
(45) Date of Patent: Feb. 9, 2016

(54) OPTIMIZING TEXTURE COMMANDS FOR GRAPHICS PROCESSING UNIT

(75) Inventors: Weifeng Zhang, San Diego, CA (US); Chihong Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 365 days.

(21) Appl. No.: 13/414,402

(22) Filed: Mar. 7, 2012

(65) Prior Publication Data

US 2013/0191816 A1 Jul. 25, 2013

Related U.S. Application Data

(60) Provisional application No. 61/589,072, filed on Jan. 20, 2012.

(51) Int. Cl.
*G06F 9/45* (2006.01)
*G06F 9/30* (2006.01)

(52) U.S. Cl.
CPC .............. *G06F 8/433* (2013.01); *G06F 8/443* (2013.01); *G06F 8/445* (2013.01); *G06F 9/30072* (2013.01)

(58) Field of Classification Search
CPC ......... G06F 8/433; G06F 8/443; G06F 8/445; G06F 9/30072
USPC ........................................................ 717/140
See application file for complete search history.

(56) References Cited

U.S. PATENT DOCUMENTS

| | | | |
|---|---|---|---|
| 6,662,294 B1 | 12/2003 | Kahle et al. | |
| 6,745,384 B1 * | 6/2004 | Biggerstaff | G06F 8/4441 712/203 |
| 7,793,079 B2 | 9/2010 | Badran-Louca et al. | |
| 2002/0112226 A1 * | 8/2002 | Brodersen et al. | G11B 27/034 717/140 |
| 2004/0088689 A1 * | 5/2004 | Hammes | G06F 17/5045 717/154 |
| 2007/0198971 A1 * | 8/2007 | Dasu et al. | G06F 8/433 717/140 |
| 2008/0198169 A1 | 8/2008 | Boyd et al. | |
| 2010/0262813 A1 | 10/2010 | Brown et al. | |
| 2011/0074810 A1 * | 3/2011 | Harper | G06T 1/20 345/619 |
| 2011/0078415 A1 | 3/2011 | Johnson et al. | |
| 2011/0078424 A1 * | 3/2011 | Boehm et al. | G06F 8/443 712/234 |
| 2012/0198428 A1 * | 8/2012 | Schmidt | G06F 8/443 717/153 |

OTHER PUBLICATIONS

Second Written Opinion from corresponding application No. PCT/US2012/068203 dated Jan. 24, 2014 (6 pages).
International Search Report and Written Opinion—PCT/US2012/068203—ISA/EPO—Mar. 1, 2013, 10 pp.

(Continued)

*Primary Examiner* — Wei Zhen
*Assistant Examiner* — Mohammed Huda
(74) *Attorney, Agent, or Firm* — Shumaker & Sieffert, P.A.

(57) ABSTRACT

Aspects of this disclosure relate to a method of compiling high-level software instructions to generate low-level software instructions. In an example, the method includes identifying, with a computing device, a set of high-level (HL) control flow (CF) instructions having one or more associated texture load instructions, wherein the set of HL CF instructions comprises one or more branches. The method also includes converting, with the computing device, the identified set of HL CF instructions to low-level (LL) instructions having a predicate structure. The method also includes outputting the converted (LL) instructions having the predicate structure.

40 Claims, 6 Drawing Sheets

(56) References Cited

OTHER PUBLICATIONS

International Preliminary Report on Patentability from International Application No. PCT/US2012/068203, dated Apr. 17, 2014, 7 pp.

Response to Second Written Opinion dated Jan. 24, 2014, from International Application No. PCT/US2012/068203, filed Mar. 24, 2014, 12 pp.

* cited by examiner

OPTIMIZING TEXTURE COMMANDS FOR GRAPHICS PROCESSING UNIT

This application claims priority to U.S. Provisional Patent Application No. 61/589,072, filed 20 Jan. 2012, the entire contents of which is hereby incorporated by reference in its entirety.

TECHNICAL FIELD

This disclosure relates to computing devices and, more particularly, graphics processing devices.

BACKGROUND

Compilers are computer programs that generate low-level software instructions, such as those defined by various machine or assembly computer programming languages, from high-level software instructions, such as those defined in accordance with various so-called high-level computer programming languages (e.g., C, C++, Java, Basic and the like). A computer programmer typically defines a computer program using high-level software instructions and invokes the compiler to generate low-level software instructions. The low-level software instructions correspond to the high-level software instructions that are executable by any given computing device that supports execution of the low-level software instructions. In this way, the compiler compiles the high-level software instructions to generate the low-level software instruction so that any given computing device may execute the computer program defined by the computer programmer using software instructions defined in accordance with a high-level programming language.

SUMMARY

In general, this disclosure describes techniques for efficient compilation of a set of control flow instructions that include one or more texture load instructions. The phrase "control flow" generally refers to a set of instructions defined in accordance with a high-level programming language directed to controlling the flow of execution of the high-level software instructions that form a computer program based on some conditional statement. That is, for example, execution of a set of control flow instructions may result in a choice being made as to which of two or more branches of high-level software instructions should be executed. A texture load instruction generally refers to an instruction that, when executed, causes a texture to be loaded to local memory of a graphics processing unit (GPU). For example, executing a texture load instruction may cause a texture (e.g., image data) to be transferred from a memory that is external to the GPU to a local memory of the GPU.

The techniques of this disclosure include converting a set of control flow (CF) instructions that include texture load instructions to one or more instructions having a predicate structure. Instructions having a predicate structure may be executed serially (e.g., without branching). Typically, converting CF statements to instructions having a predicate structure may include removing branches and executing all instructions of each branch. According to the techniques of this disclosure, however, a set of CF instructions having one or more associated texture load instructions may be converted to a predicate structure in such a way that all of the texture load instructions associated with each branch need not be executed. In this manner, the techniques may provide efficient conversion of CF statements that include texture load instructions.

In an example, aspects of this disclosure are directed to a method of compiling high-level software instructions to generate low-level software instructions. The method includes identifying, with a computing device, a set of high-level (HL) control flow (CF) instructions having one or more associated texture load instructions, wherein the set of HL CF instructions comprises one or more branches; converting, with the computing device, the identified set of HL CF instructions to low-level (LL) instructions having a predicate structure; and outputting the converted (LL) instructions having the predicate structure.

In another example, aspects of this disclosure are directed to an apparatus for compiling high-level software instructions to generate low-level software instructions, the apparatus comprising one or more processing units, the one or more processing units configured to: identify a set of high-level (HL) control flow (CF) instructions having one or more associated texture load instructions, wherein the set of HL CF instructions comprises one or more branches; convert the identified set of HL CF instructions to low-level (LL) instructions having a predicate structure; and output the converted (LL) instructions having the predicate structure.

In another example, aspects of this disclosure are directed to a computer program product for compiling high-level software instructions to generate low-level software instructions, the computer program product storing instructions that, when executed, cause one or more processors to: identify a set of high-level (HL) control flow (CF) instructions having one or more associated texture load instructions, wherein the set of HL CF instructions comprises one or more branches; convert the identified set of HL CF instructions to low-level (LL) instructions having a predicate structure; and output the converted (LL) instructions having the predicate structure.

In another example, aspects of this disclosure are directed to an apparatus for compiling high-level software instructions to generate low-level software instructions, the apparatus comprising: means for identifying a set of high-level (HL) control flow (CF) instructions having one or more associated texture load instructions, wherein the set of HL CF instructions comprises one or more branches; means for converting the identified set of HL CF instructions to low-level (LL) instructions having a predicate structure; and means for outputting the converted (LL) instructions having the predicate structure.

The details of one or more examples are set forth in the accompanying drawings and the description below. Other features, objects, and advantages will be apparent from the description and drawings, and from the claims.

DETAILED DESCRIPTION

Figure 1:
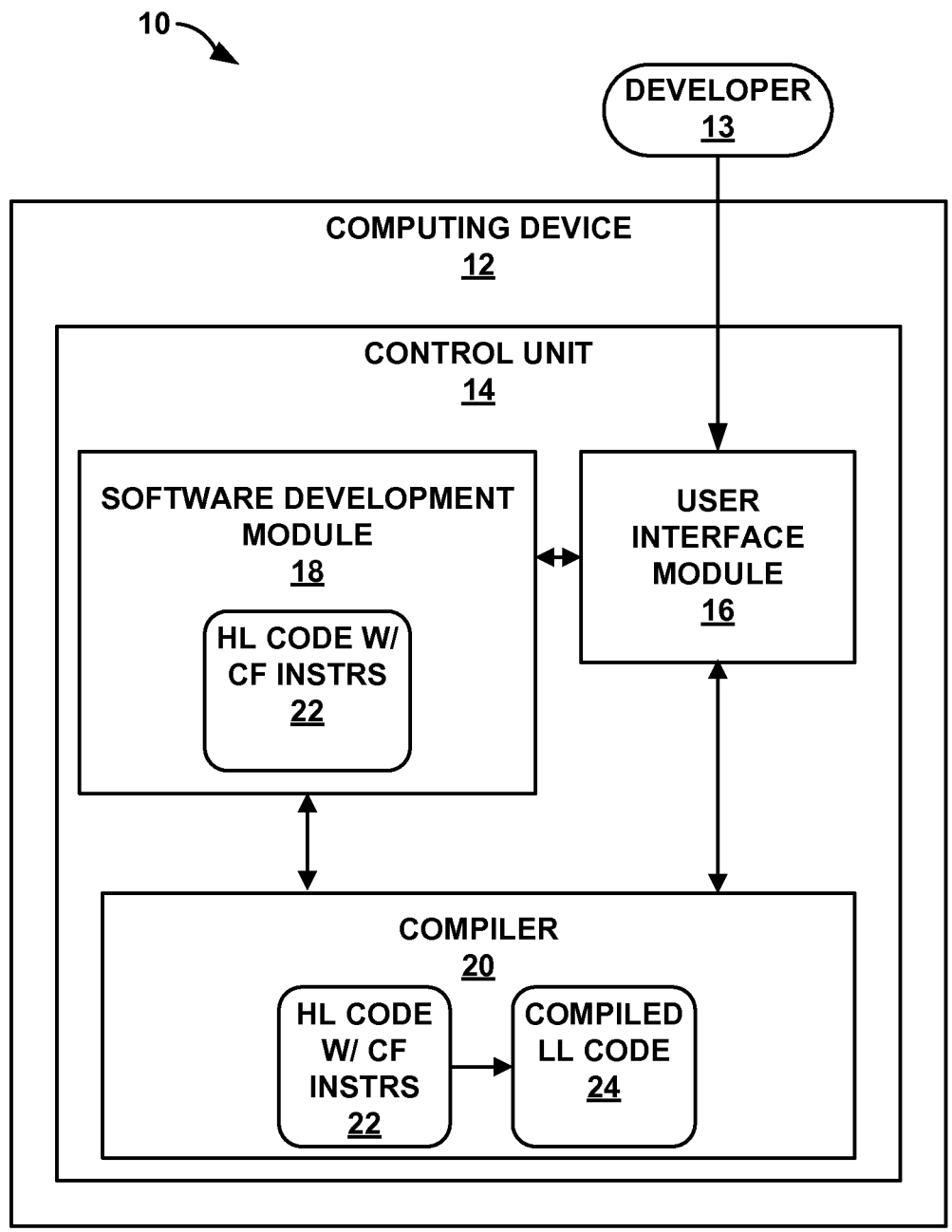
FIG. 1 is a block diagram illustrating a development system that may implement the techniques described in this disclosure.

In general, this disclosure describes techniques for efficient compilation of control flow statements that include one or more texture load instructions. The phrase "control flow" generally refers to a set of instructions defined in accordance with a high-level (HL) programming language directed to controlling the flow of execution of the HL software instructions that form a computer program based on some conditional statement. That is, execution of a control flow (CF) statement may result in a choice being made as to which of two or more branches of HL software instructions should be executed. In some instances, CF statements may also be referred to as "flow control" statements, or "conditional flow control" statements.

For example, one set of HL CF statements generally involve the use of an "if" instruction followed by a conditional statement. This conditional statement is usually defined as a Boolean statement using Boolean operators. One example conditional statement may involve a Boolean comparison to determine whether a current value of a variable is greater than a given value, which may be expressed as "x>10," where the variable is represented as x in this statement with the greater than operator being defined as the character '>.' This statement is Boolean in that it returns a Boolean value of either "true" (which is usually defined as one) or "false" (which is usually defined as zero). Following this "if" instruction are one or more additional instructions. If the conditional statement is true, the additional instructions are performed. If the conditional statement is false, the additional instructions are skipped or not performed and the flow of execution resumes after the additional instructions.

Other types of HL CF instruction sets include those defined using an "if" instruction followed by "else" instructions (commonly referred to as "if-else" CF instructions), those defined using the operator ":?" and those defined using multiple "if" statements (commonly referred to as "if-if" CFC instructions).

A texture load instruction generally refers to an instruction that, when executed, causes a texture to be loaded to local memory (e.g., local memory of a computing device, such as a graphics processing unit (GPU)). A "texture" generally refers to an object that contains one or more images all having the same format (e.g., an array of pixels of a certain dimensionality, with a particular size, and a specific format). That is, for example, a texture may be a bitmap of pixel colors that give an object the appearance of texture. In a GPU, executing a texture load instruction may cause a texture (e.g., image data) to be transferred from an external memory to a local memory of the GPU. The external memory may be off-chip relative to the GPU and may be accessed via a system bus. In some instances, as described in greater detail below, a relatively long latency may be associated with such a data transfer. For example, transferring data from an external memory to local memory may consume a relatively large number of clock cycles.

The techniques of this disclosure include converting control flow (CF) statements that include texture load instructions to one or more instructions having a predicate structure. For example, the techniques of this disclosure may include converting "IF" CF statements that include texture load instructions to one or more instructions having a predicate structure. Predicate execution support provides a manner in which to eliminate branches from instruction streams. For example, predicated execution may refer to the conditional execution of an instruction based on the value of a Boolean source operand, referred to as the predicate. Predicate execution support allows a compiler to convert conditional branches into predicated defining instructions, and instructions along alternative paths of each branch into predicated instructions. That is, predicated instructions may be fetched regardless of their predicate value. Instructions whose predicate is true are executed normally. Conversely, instructions whose predicate is false are nullified, and thus are prevented from modifying the state of the GPU. Accordingly, instructions having a predicate structure may be executed serially (e.g., without branching).

Converting CF instructions of a program to instructions having a predicate structure may increase the number of instructions that are ultimately executed by a processing device. For example, with predication, a processing device effectively evaluates both sides of a branch and discards one of the results. In some instances, evaluating both sides of a branch can be relatively costly, particularly if the paths include large and/or complex statements.

Some processing architectures, however, may execute predicated instructions more efficiently than CF instructions. For example, due to the parallel nature of GPUs (sometimes referred to as "stream processors"), certain GPU architectures may execute predicated instructions more efficiently than CF instructions. For instance, branches of CF instructions may impose control dependencies that restrict the number of independent instructions available to be executed each clock cycle. In addition, while certain processing units may perform speculative execution intended to reduce the latency associated with the dependencies, misprediction of branches may also result in performance penalties.

In instances in which a processing unit (e.g., such as a GPU) includes predicate support, the compiler may perform full predicate conversion or partial predicate conversion. Full predicate support allows all CF instructions to be converted to a predicate structure. In contrast, partial predicate support limits the types of instructions that may be converted to a predicate structure. For example, some GPUs only allow partial predicate support, and in such instances, corresponding GPU compilers may limit the set of instructions that are converted to conditional move instructions (e.g., MOVC) and/or select instructions (e.g., SELECT).

Some compilers, such as some GPU compilers, may choose not to perform partial predicate conversion, because the cost of converting certain instructions may outweigh the benefits of the predicate structure. For example, as noted above, a texture load instruction may cause a texture (e.g., image data) to be transferred from an external memory to a local memory of the GPU. In some instances, a relatively long latency may be associated with such a data transfer. Due to the relatively long latencies associated with texture load instructions, a compiler may not convert a set of CF instructions that include texture load instructions to a predicate structure. For example, executing the texture load instructions of each branch may typically outweigh the benefits of conversion.

The techniques of this disclosure include converting a set of CF instructions having one or more associated texture load instructions to a predicate structure in such a way that avoids executing every texture load instruction associated with each branch of the set of CF instructions. In this manner, a GPU compiler implementing the techniques of this disclosure may implement the predicate structure suited to GPU architectures while minimizing the latency inherent in texture load instructions.

FIG. 1 is a block diagram illustrating a development system 10 that may implement the techniques of this disclosure directed to conversion of control flow (CF) instructions having one or more associated texture load instructions to instructions having a predicate structure (predicated instructions). In the example of FIG. 1, development system 10 includes a computing device 12. Computing device 12 may comprise a desktop computer, a laptop computer (including so-called "netbook" computers), a workstation, a slate or tablet computer, a personal digital assistant (PDA), a mobile or cellular phone (including so-called "smart phones"), a digital media player, a gaming device, or any other device with which a user, such as a software developer 13, may interact to define high-level (HL) code and then compile HL code to generate low-level (LL) code. In this disclosure, the term "code" generally refers to a set of one or more software instructions that define a computer program, software, or other executable file.

Compute device 12 includes a control unit 14. Control unit 14 may comprise one or more processors (not shown in the example of FIG. 1), such as programmable microprocessors, that execute software instructions, such as those used to define a software or computer program, stored to a computer-readable storage medium (again, not shown in the example of FIG. 1), such as a storage device (e.g., a magnetic hard disk drive, solid state drive, or an optical drive), or memory (such as Flash memory, random access memory or RAM) or any other type of volatile or non-volatile memory, that stores instructions to cause a programmable processor to perform the techniques described herein. Alternatively, control unit 14 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of programmable processors, dedicated hardware, or the like, for performing the techniques described herein.

Control unit 14 executes or otherwise implements a user interface (UI) module 16, a software development module 18 and a compiler 20. That is, in some examples, UI module 16, software development module 18, and/or compiler 20 may be comprised of software executed by control unit 14. UI module 16 represents a module that presents a user interface with which a user, such as developer 13, may interface to interact with software development module 18 and compiler 20. UI module 16 may present any type of user interface, such as a command line interface (CLI) and/or a graphical user interface (GUI), with which developer 13 may interact to interface with modules 18 and 20.

Software development module 18 represents a module that facilitates the development of software in terms of a HL programming language. Typically, software development module 18 presents one or more user interfaces via UI module 16 to developer 13, whereby developer 13 interacts with these user interfaces to define software in the form of high-level (HL) code 22. As described in greater detail below, HL code 22 may include control flow (CF) instructions. Again, the term "code" as used in this disclosure refers to a set of one or more software instructions that define a computer program, software or other executable file. HL code 22 typically represents instructions defined in what is commonly referred to as a HL programming language. An HL programming language generally refers to a programming language with some abstraction from the underlying details of the computer, such as memory access models of processors and management of scope within processors.

HL programming languages generally provides for a higher level of abstraction than low level (LL) programming languages, which is a term that generally refers to machine programming languages and assembly programming languages. Examples of HL programming languages include a C programming language, a so-called "C++" programming language, a Java programming language, visual basic (VB) programming language, and a Basic programming language. In some examples, a HL programming language may be tailored for a particular purpose, such as generating HL code for execution of graphics processing units (GPUs). Examples of such HL programming languages include an Open Graphics Library (GL) programming language, an Open GL Embedded Systems (ES) programming language, or High Level Shader Language (HLSL). Many HL programming languages are object-oriented in that they enable the definition of objects (which may comprise, for example, instructions, interfaces, and data structures) capable of storing data and open to manipulation by algorithms in order to abstractly solve a variety of problems without considering the underlying architecture of the computing device.

Compiler 20 represents a module that reduces HL instructions defined in accordance with a HL programming language to LL instructions of a LL programming language. After compilation, these LL instructions are capable of being executed by specific types of processors or other types of hardware, such as FPGAs, ASICs, and the like. LL programming languages are considered low level in the sense that they provide little abstraction, or a lower level of abstraction, from an instruction set architecture of a processor or the other types of hardware. LL languages generally refer to assembly and/or machine languages. Assembly languages are a slightly higher LL language than machine languages but generally assembly languages can be converted into machine languages without the use of a compiler or other translation module. Machine languages represent any language that defines instructions that are similar, if not the same as, those natively executed by the underlying hardware, e.g., processor, such as the x86 machine code (where the x86 refers to an instruction set architecture of an x86 processor developed by Intel Corporation).

Compiler 20 in effect translates HL instructions defined in accordance with a HL programming language into LL instructions supported by the underlying hardware and removes the abstraction associated with HL programming languages such that the software defined in accordance with these HL programming languages is capable of being more directly executed by the actual underlying hardware. Typically, compilers, such as compiler 20, are capable of reducing HL instructions associated with a single HL programming language into LL code, such as LL code 24, comprising instructions defined in accordance with one or more LL programming languages, although some compilers may reduce HL instructions associated with more than one HL programming language into LL instructions defined in accordance with one or more LL programming languages.

While software development module 18 and compiler 20 are shown as separate modules in the example of FIG. 1 for purposes of explanation, in some examples, software development module 18 and compiler 20 may be combined in a single module referred to commonly as an integrated development environment (IDE). The techniques of this disclosure should not be limited in this respect to separate modules 18 and 20 shown in the example of FIG. 1, but may apply to instances where these are combined, such as in an IDE. With an IDE, developers may both define software using HL instructions and generate an executable file comprising LL instructions capable of being executed by a processor (e.g., such as a GPU) or other types of hardware by employing the compiler to translate the HL instructions into the LL instructions. Typically, IDEs provide a comprehensive GUI with which developers may interact to define and debug the software defined using HL instructions, compile the HL instructions into LL instructions and model execution of the LL instructions so as to observe how execution of the LL instructions would perform when executed by hardware either present within the device or present within another device, such as a cellular phone.

For example, the Open GL ES programming language is a version of Open GL (which was developed for execution by desktop and laptop computers) that is adapted for execution not on personal computers, such as desktop and laptop computers, but on mobile devices, such as cellular phones (including so-called smart phones), netbook computers, tablet computers, slate computers, digital media players, gaming devices, and other portable devices. Open GL and, therefore, Open GL ES provide for a comprehensive architecture by which to define, manipulate and render both two-dimensional (2D) and three-dimensional (3D) graphics. The ability to model these mobile devices, which may have processors that have vastly different instruction set architectures than those common in personal computers, within an IDE has further increased the desirability of IDEs as a development environment of choice for developers seeking to develop software for mobile devices. While not shown in the example of FIG. 1, control unit 14 may also execute or implement a modeler module capable of modeling the execution of LL software instructions by hardware that is often not natively included within computing device 12, such as mobile processors and the like.

In any event, one function of compilers, such as compiler 20, may involve translation of control flow (CF) instructions of HL code 22 (e.g., defined in accordance with a HL programming language) into LL code 24 (e.g., defined in accordance with a LL programming language) having instructions with a predicate structure. CF instructions refer to any instruction by which the flow of execution of the instructions by the processor may be controlled. For example, many HL programming languages specify an "if" instruction whose syntax commonly requires a definition of a conditional statement following the invocation of this "if" instruction. This conditional statement is usually defined as a Boolean statement using Boolean operators.

One example conditional statement may involve a Boolean comparison to determine whether a current value of a variable is greater than a given value, which may be expressed as "x>10," where the variable is represented as 'x' in this statement with the greater than Boolean operator being defined as the character '>.' This statement is Boolean in that it returns a Boolean value of either "true" (which is usually defined as one) or "false" (which is usually defined as zero). Following this "if" instruction is one or more additional instruction, and if the conditional statement is true, the additional instructions are performed. If the conditional statement is false, the additional instructions are skipped or not performed and the flow of execution resumes after the additional instructions. In this sense, the "if" instruction conditions and thereby controls the execution of the additional instructions upon the evaluation of conditional, often Boolean, statement. For this reason, the "if" instruction is commonly referred to as a CF instruction.

Other types of HL CF instruction sets include those defined using an "if" instructions followed by "else" instructions (commonly referred to as "if-else" or "if-then-else" CF instructions), those defined using the operator ":?" and those defined using multiple "if" statements (commonly referred to as "if-if" CF instructions). In "if-else" instruction sets, the "if" instruction is the same as that discussed above, but the flow or control of execution is modified by the "else" statement such that when the conditional statement following the "if" is false, a second set of additional instructions following the "else" instruction is executed. This second set of additional instructions is only executed if the conditional statement following the "if" instruction is false, thereby providing a further level of control over the execution of instructions.

The ":?," instruction generally refers to a ternary operator that mimics the "if-else" instructions. This instruction may also be commonly known as the "?:" instruction. Typically, the "?" instruction or operator is preceded by a conditional, and often Boolean, statement and directly followed by a value to be assigned to a variable if the conditional statement is true. This "true" value is then followed by the ":" instruction or operator, which is in turn followed by a value to be assigned to a variable if the conditional statement is false. The "if-if" instruction sets generally refer to a sequence of "if" statements that are the same or at least similar in form to the "if" statements defined above. The "if-if" instruction sets may be employed in a manner similar to that of "if-else" instruction sets, such as when a first "if" instruction is followed by a certain conditional statement and a set 'if' instruction following the first has the inverse of the conditional statement defined for the first "if" instruction.

In some examples, compiler 20 may include partial predicate support. That is, for example, compiler 20 may convert HL code 22 having certain types of CF instructions to instructions having a predicate structure, while refraining from converting other types of CF instructions. In an example, compiler 20 may convert move instructions (e.g., MOVC) and/or select instructions (e.g., SELECT) of HL code 22 to instructions having a predicate structure, while refraining from converting other conditional, loop, or CF instructions. In general, converting a set of CF instructions of HL code 22 to instructions having a predicate structure may include defining a set of instructions that evaluates each branch of the set of CF instructions and discards one of the results.

In examples in which compiler 20 is configured as a so called partial predicate compiler, compiler 20 may not typically convert a set of CF instructions having texture load instructions to instructions having a predicate structure due to latencies associated with texture loads. For example, when a texture load instruction is executed, a GPU may load a texture (e.g., image data) from an external memory to a local memory of the GPU. In some instances, a relatively long latency may be associated with such a data transfer. That is, transferring data from an external memory to local memory may consume a relatively large number of clock cycles. Converting a set of such CF instructions having texture load instructions may involve executing all texture load instructions associated with the set of CF instructions and selecting the appropriate loaded texture. The time required to execute all texture load instructions associated with a set of CF instructions may outweigh the efficiencies (e.g., hardware efficiencies) gained by conversion to instructions having a predicate structure.

The techniques of this disclosure include translating HL code 22 that includes a set of CF instructions having one or more associated texture load instructions to LL code 24 that is defined in accordance with a LL programming language. Conversion, according to the techniques of this disclosure, removes the control flow and may be performed in such a way that avoids executing all texture load instructions associated with each branch of the set of CF instructions.

According to some aspects of this disclosure, a set of CF instructions having texture load instructions may be converted to instructions having a predicate structure by generating instructions having a predicate structure on texture coordinates. Coordinates may include, for example, particular addresses in memory. Thus, the result of the instructions having a predicate structure may point to a particular memory address. An instruction may then be used to load a texture from the particular memory address. In this way, a single texture may be loaded from an address defined according to predicated instructions.

In a non-limiting example for purposes of illustration, HL code 22 may include an if-else CF statement having texture load instructions associated with each path of the if-else statement. That is, for example, if the "if" path of the if-else statement is true, a texture is loaded from a first memory address. Conversely, if the "if" path is false, the "else" path of the if-else statement is executed and the texture is loaded from a second memory address. Such an if-else statement may be represented as: if(condition) {x=texture(coordinate1);} else {x=texture(coordinate2);}.

In this example, according to aspects of this disclosure, compiler 20 may convert the if-else CF statement to LL code 24 having instructions with a predicate structure. That is, compiler 20 may generate a predicate instruction on the texture coordinates. For example, with respect to the if-else statement described above, the converted if-else statement may be represented as: {new_coordinate=condition ? coordinate1:coordinate 2; x=texture(new_coordinate);}. By replacing the if-else statement with a ternary operator that is executed on texture coordinates, the statement may be executed without loading the textures. In addition, the if-else control flow is removed and the instructions may be executed without branching. While the example is described with respect to a single if-else statement, it should be understood that the techniques of this disclosure may be generalized with respect to other sets of CF instructions, including nested control flow structures.

In this manner, compiler 20, executed by control unit 14, may implement the techniques of this disclosure to convert a set of CF instructions having texture load instructions to instructions having a predicate structure. Converting the set of CF instructions having texture load instructions may increase efficiency for some processing architectures, such as GPUs. For example, the converted instructions having the predicate structure may be executed serially (without feedback loops). Moreover, by limiting the number of texture load instructions that are executed, latencies associated with transferring data from external memory to on-chip memory of a GPU can be minimized.

In some examples, compiler 20 may apply the techniques of this disclosure to a set of CF instructions having symmetric texture load instructions. Symmetric texture load instructions generally refer to a set of CF instructions having the same or approximately the same number of texture load instructions associated with each path of the set of CF instructions. In an example for purposes of illustration, an if-else statement has a first path associated with the "if" portion of the statement and a second path associated with the "else" portion of the statement. According to aspects of the disclosure, compiler 20 may determine whether the number of texture load instructions associated with the first path is approximately equal to the number of texture load instructions associated with the second path.

If the texture load instructions are approximately symmetric, compiler 20 may perform the techniques of this disclosure to convert the set of CF instructions to instructions having a predicate structure. If the texture load instructions are not symmetric (e.g., only one path includes texture load instructions), compiler 20 may refrain from converting the CF instructions. Compiler 20 may not convert the set CF instructions having asymmetric texture load instructions, because there is potentially less incentive to convert the instructions (e.g., the CF instructions may remain intact). For example, if a set of CF instructions has one path that includes a texture load instruction, and another path that does not include a texture load instruction, there is a possibility that the texture load instruction will not be executed and the latency associated with the texture load instruction will not be incurred (e.g., if the path without the texture load instruction is true). Due to this possibility, compiler 20 may refrain from expending the computational and/or time cost associated with converting the set of CF instructions.

While the examples are described with respect to a single texture load instruction associated with each path of a set of CF instructions, the techniques of this disclosure are not limited in this way. That is, compiler 20 may determine whether texture load instructions are approximately symmetric for more than one branch of a set of CF instructions. Moreover, the texture load instructions do not need to be explicitly symmetric in nature. For example, compiler 20 may perform the techniques of this disclosure for converting CF instructions despite one path having more or fewer associated texture load instructions than another path (e.g., one path has two associated texture load instructions, and another path has one or three texture load instructions) as long as the texture coordinates of these loads can be predicated properly.

Figure 2:
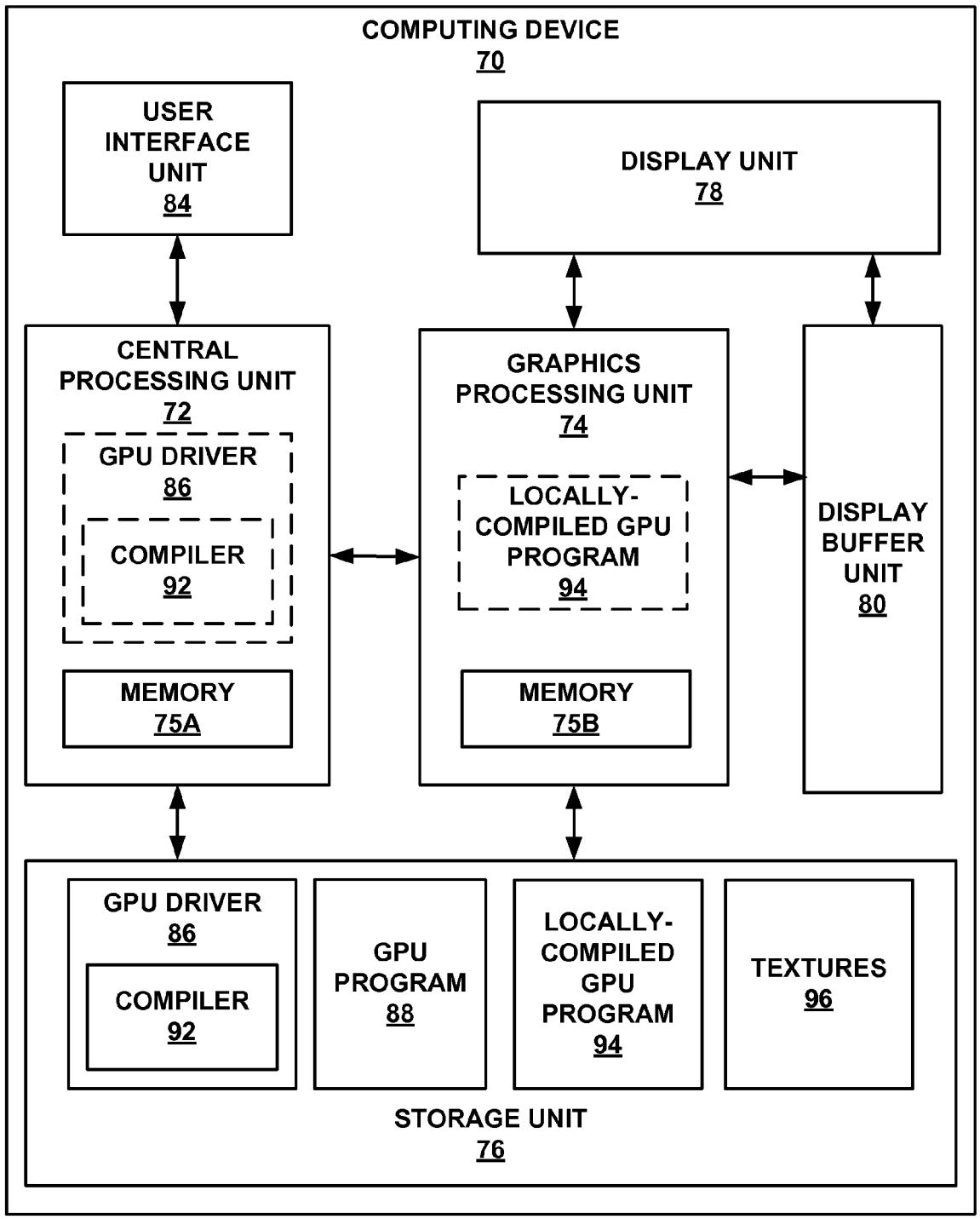
FIG. 2 is a block diagram illustrating a computing device that may implement the techniques described in this disclosure.

FIG. 2 is a block diagram illustrating another computing device 70 that may implement the techniques described in this disclosure. In the example of FIG. 2, computing device 70 represents a mobile device, such as any combination of a cellular phone (including so-called "smart phones"), a laptop computer, and a so-called "netbook," or a personal digital assistant (PDA), a digital media player, a gaming device a geographical positioning system (GPS) unit, an embedded system, a portable media systems, or any other type of computing device that typically implement or support OpenGL ES in accordance with the OpenGL ES specification. It should be understood, however, that the techniques of this disclosure are not limited to mobile devices.

In the example of FIG. 2, computing device 70 includes a central processing unit (CPU) 72, a graphics processing unit (GPU) 74, a storage unit 76, a display unit 78, a display buffer unit 80, and a user interface unit 84. In one example, control unit 14 shown in the example of FIG. 1 may comprise units 72-76 and 80. Although CPU 72 and GPU 74 are illustrated as separate units in the example of FIG. 2, CPU 72 and GPU 74 may be integrated into a single unit, such as in the case when the GPU is integrated into the CPU. CPU 72 represents one or more processors that are capable of executing machine or LL instructions. In some examples, CPU 72 may include memory 75A.

GPU 74 represents one or more dedicated processors for performing graphical operations. That is, for example, GPU 74 may be a dedicated hardware unit having fixed function and programmable components for rendering graphics and executing GPU applications. GPU 74 may also include a DSP, a general purpose microprocessor, an ASIC, an FPGA, or other equivalent integrated or discrete logic circuitry. GPU 74 may also include other components, such as dedicated GPU memory 75B.

As noted above, each of CPU 72 and GPU 74 may include memory 75A, 75B ("memory 75"). Memory 75 may represent on-chip storage or memory used in executing machine or object code. Memory 75 may each comprise a hardware memory register capable of storing a fixed number of digital bits. CPU 72 and GPU 74 may be able to read values from or write values to local memories 75A, 75B, respectively, more quickly than reading values from or writing values to storage unit 76, which may be accessed, e.g., over a system bus. In some examples, memory 75A may be on-chip memory with CPU 72 and memory 75B may be on-chip memory with GPU 74.

Storage unit 76 may comprise one or more computer-readable storage media. Examples of storage unit 76 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a computer or a processor.

In some example implementations, storage unit 76 may include instructions that cause CPU 72 and/or GPU 74 to perform the functions ascribed to CPU 72 and GPU 74 in this disclosure. Storage unit 76 may, in some examples, be considered as a non-transitory storage medium. The term "non-transitory" may indicate that the storage medium is not embodied in a carrier wave or a propagated signal. However, the term "non-transitory" should not be interpreted to mean that storage unit 76 is non-movable. As one example, storage unit 76 may be removed from computing device 70, and moved to another device. As another example, a storage unit, substantially similar to storage unit 76, may be inserted into computing device 70. In certain examples, a non-transitory storage medium may store data that can, over time, change (e.g., in RAM).

Display unit 78 represents a unit capable of displaying video data, images, text or any other type of data for consumption by a viewer. Display unit 78 may include a liquid-crystal display (LCD), a light emitting diode (LED) display, an organic LED (OLED), an active-matrix OLED (AMOLED) display, or the like. Display buffer unit 80 represents a memory or storage device dedicated to storing data for presentation of imagery, such as photos or video frames, for display unit 78. User interface unit 84 represents a unit with which a user may interact with or otherwise interface to communicate with other units of computing device 70, such as CPU 72. Examples of user interface unit 84 include, but are not limited to, a trackball, a mouse, a keyboard, and other types of input devices. User interface unit 84 may also be a touch screen and may be incorporated as a part of display unit 78.

Computing device 70 may include additional modules or units not shown in FIG. 2 for purposes of clarity. For example, computing device 70 may include a speaker and a microphone, neither of which are shown in FIG. 2, to effectuate telephonic communications in examples where computing device 70 is a mobile wireless telephone, or a speaker where computing device 70 is a media player. In some instances, user interface unit 84 and display unit 78 may be external to computing device 78 in examples where computing device 78 is a desktop computer or other device that is equipped to interface with an external user interface or display.

As illustrated in the example of FIG. 2, storage unit 76 stores a GPU driver 86, GPU program 88, and compiler 92. As described in greater detail below, storage unit 76 may also store locally-compiled GPU program 94 and texture data 96. GPU driver 86 represents a computer program or executable code that provides an interface to access GPU 74. CPU 72 executes GPU driver 86 or portions thereof to interface with GPU 74 and, for this reason, GPU driver 86 is shown in the example of FIG. 2 as a dash-lined box labeled "GPU driver 86" within CPU 72. GPU driver 86 is accessible to programs or other executables executed by CPU 72, including GPU program 88.

GPU program 88 may comprise a program written in a HL programming language, such as an Open-Computing Language (which is known commonly as "OpenCL"), OpenGL ES, HLSL, or another HL programming language that utilizes the dedicated GPU-specific operations provided by GPU 88. GPU programs developed using the OpenGL specification may be referred to as shader programs. Alternatively, GPU programs developed using the OpenCL specification may be referred to as program kernels. The techniques of this disclosure, however, are not limited to a particular HL programming language. For example, GPU program 88 may be embedded or otherwise included within another program executing on CPU 72.

Figure 3:
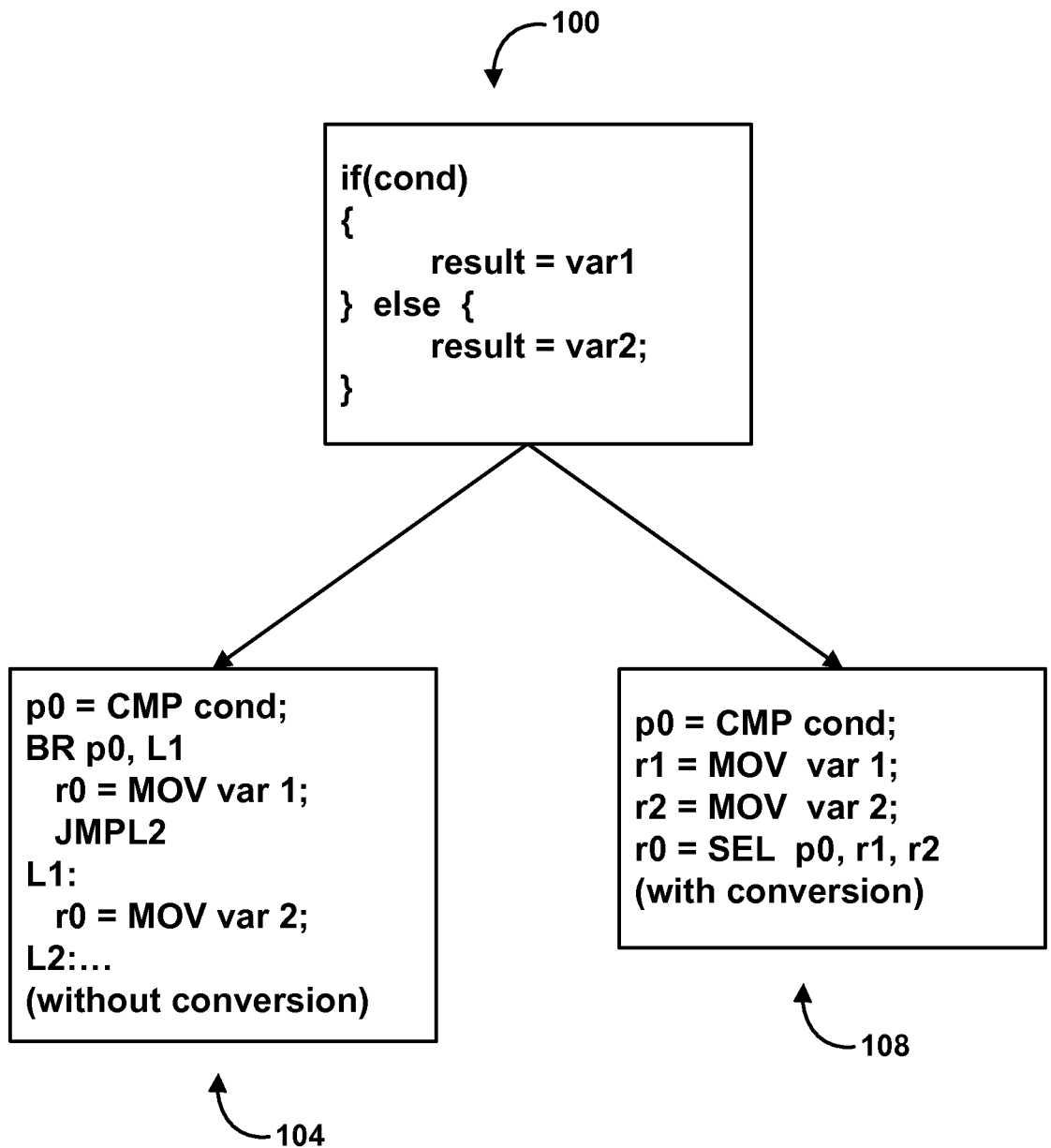
FIG. 3 illustrates example pseudo code that includes a control flow instruction that has been compiled without predicate conversion, as well as with predicate conversion.

GPU program 88 may invoke or otherwise include one or more functions provided by GPU driver 86. CPU 72 generally executes the program in which GPU program 88 is embedded and, upon encountering GPU program 88, passes GPU program 88 to GPU driver 86. CPU 72 executes GPU driver 86 in this context to process GPU program 88. That is, for example, GPU driver 86 may process GPU program 88 by compiling GPU program 88 into object or machine code executable by GPU 74. This object code is shown in the example of FIG. 3 as locally compiled GPU program 94.

To compile this GPU program 88, GPU driver 86 includes a compiler 92 that compiles GPU program 88. That is, in some examples, compiler 92 may be substantially similar to compiler 20 described above with respect to FIG. 1, except that compiler 92 operates in real-time or near-real-time to compile GPU program 88 during the execution of the program in which GPU program 88 is embedded. Compiler 92 may utilize the techniques of this disclosure to convert CF instructions having texture load instructions to instructions having a predicate structure.

For example, compiler 92 may receive GPU program 88 from CPU 72 when executing HL code that includes GPU program 88. Compiler 92 may compile GPU program 88 to generate locally-compiled GPU program 94 that conforms to a LL programming language (e.g., such as a machine language or an assembly language). In some examples, GPU program 94 may be defined in accordance with an OpenGL ES shading language. GPU program 88 may include HL CF or other loop instructions including texture load instructions that compiler 92 compiles in accordance with the techniques of this disclosure. Compiler 92 then outputs locally-compiled GPU program 94 that includes the LL instructions.

GPU 74 generally receives locally-compiled GPU program 94 (as shown by the dashed lined box labeled "locally-compiled GPU program 94" within GPU 74), whereupon, in some instances, GPU 74 renders an image and outputs the rendered portions of the image to display buffer unit 80. Display buffer unit 80 may temporarily store the rendered pixels of the rendered image until the entire image is rendered. Display buffer unit 80 may be considered as an image frame buffer in this context. Display buffer unit 80 may then transmit the rendered image to be displayed on display unit 48. In some alternate examples, GPU 74 may output the rendered portions of the image directly to display unit 78 for display, rather than temporarily storing the image in display buffer unit 80. Display unit 78 may then display the image stored in display buffer unit 78.

During execution of compiled GPU program 94 data may be transferred between storage unit 76 and GPU memory 75B. For example, the capacity of GPU memory 75B (which may be on-chip memory) may be relatively small compared to the capacity of storage unit 76. Accordingly, when executing program 94, GPU 74 may transfer data from storage unit 76 to memory 75B, process the data, and store the processed data to storage unit 76 and/or display buffer 80. In some instances, limiting the amount of data and/or number of times data is transferred between storage unit 76 and memory 75B may improve performance. For example, transferring data between storage unit 76 and memory 75B may introduce latencies associated with the data transfer. Such latencies may present a bottleneck, particularly if data is fetched from storage unit 76 to memory 75B during run time (e.g., during which GPU program 88 is compiled to form compiled GPU program 94 and executed). Moreover, fetching data from storage unit 76 consumes power. A computing device, such as computing device 70, that is powered using a limited power source (e.g., a mobile computing device that is powered by a battery), decreasing power consumption increases the longevity with which computing device 70 may operate between charges.

In some cases, GPU 74 may generate and/or access texture data 96 during execution of compiled GPU program 94 and may store the texture data 96 to storage unit 76 and/or display buffer 80. Texture data 96 may include, for example, one or more objects that contain one or more images having the same format (e.g., an array of pixels of a certain dimensionality, with a particular size, and a specific format). GPU 74 may store texture data 96 to GPU memory 75B so that it may be used during rendering. In an example, texture data 96 may include data associated with a particular color. When rendering pixel data that includes the particular color, GPU 74 may load the appropriate texture data from storage unit 76 to memory 75B. That is, GPU 74 may execute a texture load instruction of compiled GPU program 94 to transfer the particular texture from storage unit 76 to memory 75B. GPU may then render the pixel data using the texture and store the rendered pixel data to display buffer unit 80.

According to aspects of this disclosure, compiler 92 may convert HL CF instructions of GPU program 88 that include texture load instructions (e.g., instructions that cause GPU 74 to load textured data 96 from storage unit 76 to local GPU memory 75B) to LL instructions having a predicate structure. For example, compiler 92 may generate, after converting the HL instructions, locally-compiled GPU program 94 for execution by GPU 74 that removes the CF instructions. Compiler 92 may convert the HL CF instructions of GPU program 88 in such a way that avoids executing all texture load instructions associated with each branch of the set of CF instructions, and thereby may reduce the number of accesses to storage unit 78.

In some examples, compiler 92 may convert HL CF instructions having texture loads to instructions having a predicate structure by generating LL instructions having a predicate structure on texture coordinates. For example, as described in greater detail with respect to FIG. 5, compiler 92 may generate instructions having a predicate structure, the result of which may point to a particular memory address, e.g., a memory address in memory 75B. Compiler 92 may also generate an instruction that loads a texture to the particular memory address in memory 75B, for example, based on the instructions having the predicate structure.

In this way, compiler 92 may increase the efficiency of GPU 74. For example, converting CF instructions having texture load instructions to instructions having a predicate structure may allow GPU 74 to execute the compiled GPU program 94 serially (without feedback loops). Moreover, by limiting the number of texture load instructions that are executed, latencies associated with transferring data from storage unit 76 to memory 75B can be minimized. In addition, limiting the number of texture load instructions that are executed may also help to conserve power, for example, by limiting the amount of data transferred between storage unit 76 and memory 75B.

In some examples, as described with respect to FIG. 1 above, compiler 92 may apply the techniques of this disclosure to CF instructions of GPU program 88 having symmetric texture load instructions. That is, if texture load instructions are approximately symmetric (e.g., branches having a relatively proportional number of texture load instructions) with respect to a set of CF instructions being converted, compiler 92 may perform the techniques of this disclosure to convert the set of CF instructions to instructions having a predicate structure. If the texture load instructions are not symmetric (e.g., only one path includes texture load instructions), however, compiler 92 may refrain from converting the CF instructions.

According to some aspects of this disclosure, by removing CF instructions having associated texture load instructions from GPU program 88 compiler 92 may have increased flexibility regarding scheduling the execution of compiled GPU program 94. For example, if there are one or more other instructions included in the HL GPU program 88 prior to CF instructions having texture loads, which the CF condition (of the CF instructions) and texture load coordinates have no dependencies upon, compiler 20 may schedule the texture load instructions to execute prior to the one or more other instructions.

FIG. 3 illustrates translation of HL pseudo code that includes a set of CF instructions 100 to LL instructions 104 that do not have predicate structure ("without conversion"), and to LL instructions 108 that do have a predicate structure ("with conversion"), e.g., by compiler 20 or 92. As shown in FIG. 3, LL instructions 104 without conversion include CF instructions such as branch (BR) and jump (JMP) commands. As such, the LL instructions 104 may not be executed serially. That is, for example, the jump command JMPL2 may be executed, thereby changing the instruction pointer register such that L2 is executed (rather than L1).

LL instructions 108, however, have been translated such that the branch (BR) and jump (JMP) commands have been removed. Accordingly, the LL instructions 108 may be executed serially. While executing LL instructions 108 may result in more instructions being executed relative to LL instructions 104, by removing the CF instructions certain processing units, such as GPU 74, may execute LL instructions 108 more quickly and/or with a higher degree of accuracy (e.g., resulting in the appropriate values being stored to the appropriate registers) than LL instructions 104. For example, the parallel nature of arithmetic logic units (ALUs) that may be included in GPU 74 (not shown) may not efficiently handle branch, jump, or other CF instructions.

In some examples, a compiler (such as compiler 20 or compiler 92) may be restricted in the instructions that can be converted to instructions having a predicate structure. Such compilers may be referred to as "partial predicate" compilers, because the compilers may only convert a limited set instructions such as "move" (e.g., MOVC) and "select" (e.g., SELECT) instructions.

Figure 4:
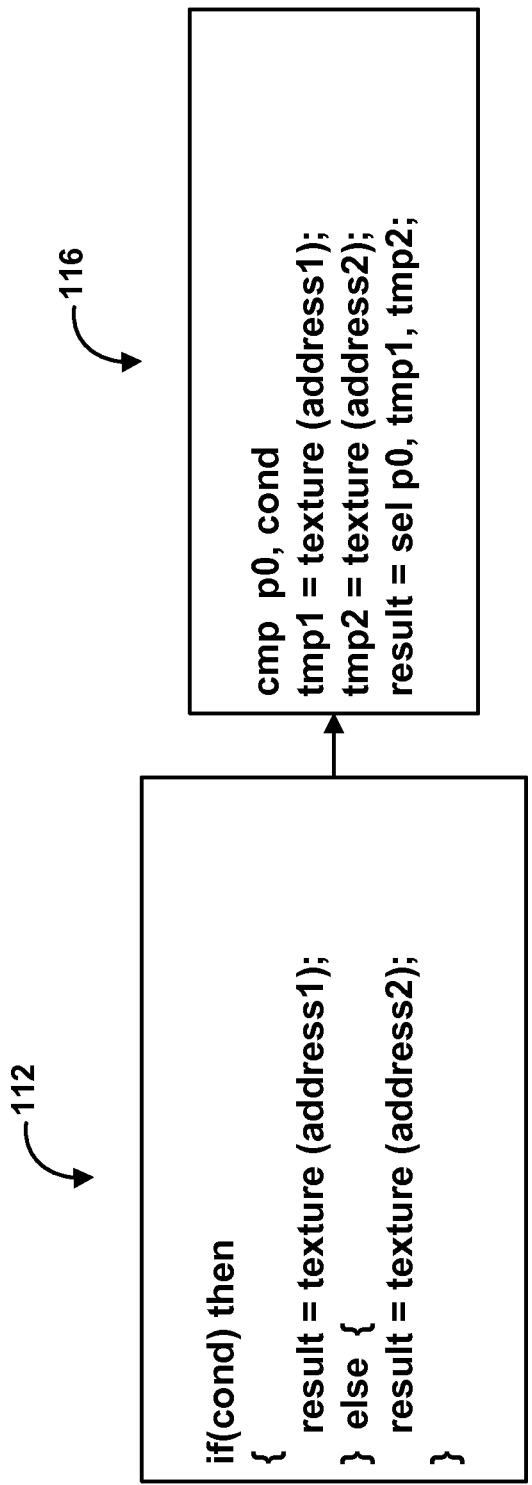
FIG. 4 illustrates example pseudo code that includes a control flow instruction having texture loads, the instruction being compiled with traditional predicate conversion.

FIG. 4 illustrates translation of HL pseudo code that includes a set of CF instructions 112 having texture load instructions ("texture (address1)" and "texture(address2)") to LL instructions 116 having a predicate structure. Such a translation may be performed by a compiler, such as compiler 20 (FIG. 1) or compiler 92 (FIG. 2). Such translation, however, may not typically be performed, as both texture load instructions of CF instructions 112 must be executed. That is, by converting CF instructions 112 in the manner shown in FIG. 4, each of the texture load instructions are executed and the appropriate texture is selected.

As noted above, executing a texture load instruction results in texture data being transferred from an external memory to a local memory. Accordingly, a relatively high latency may be associated with texture load instructions. Due to this high latency, a compiler may not perform the conversion shown in the example of FIG. 4.

Figure 5:
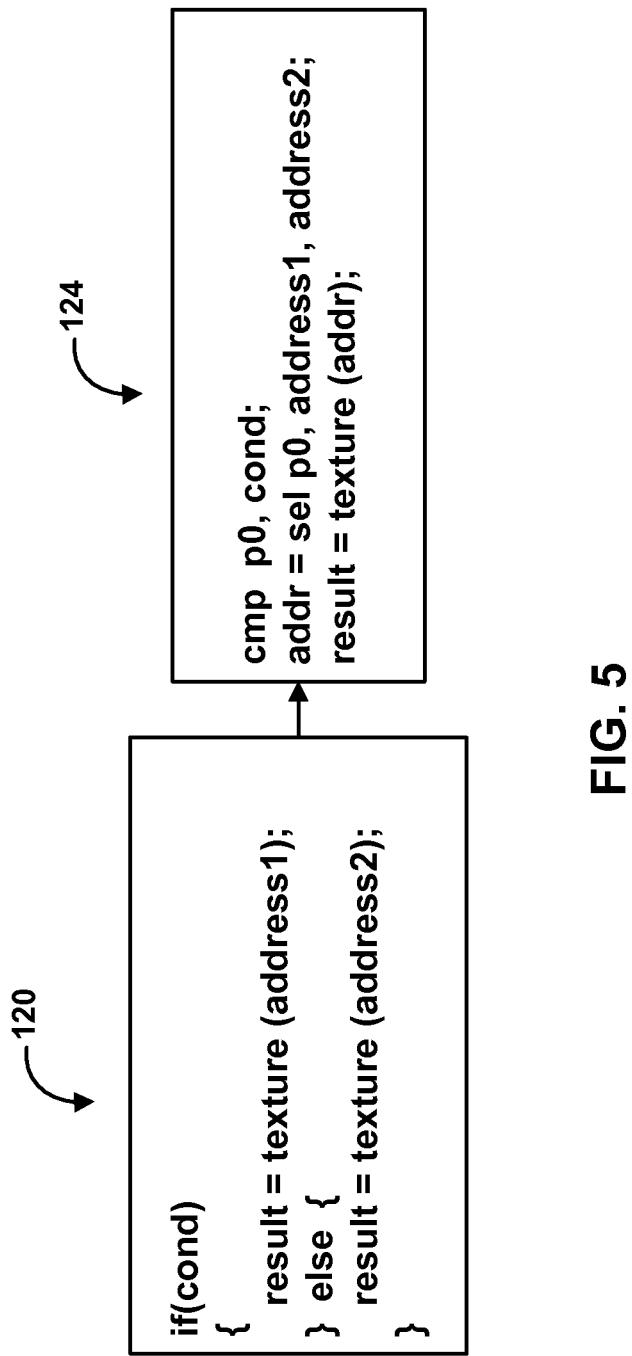
FIG. 5 illustrates example pseudo code that includes a control flow instruction having texture loads that has been converted according to the techniques of this disclosure.

FIG. 5 illustrates translation of HL pseudo code that includes a set of CF instructions 120 having texture load instructions ("texture (address1)" and "texture(address2)") to LL instructions 124 having a predicate structure, according to the techniques of this disclosure. Such a translation may be performed by a compiler, such as compiler 20 (FIG. 1) or compiler 92 (FIG. 2). It should be understood that the code of FIG. 5 is provided for purposes of example only. That is, while FIG. 5 illustrates an if-else instruction, other CF and/or loop instructions (including more complex instructions) may be translated to predicate instructions by a compiler in a similar manner. Moreover, the LL assembly language instructions of block 124 is provided for purposes of example only, and CF instructions 120 may be compiled to one or more other LL languages.

As shown in FIG. 5, according to aspects of this disclosure, the set of CF instructions 120 having texture load instructions may be converted to LL instructions 124 having a predicate structure. The conversion is performed, for example, by generating LL instructions 124 on texture coordinates that have a predicate structure. For example, the LL instructions 124 include a comparison (cmp) of variable p0 to a condition (cond). An address (addr) is reserved based on an outcome of the condition. an address call is used (addr) in combination with a selection function (sel). That is, depending on the outcome of the selection (e.g., if sel p0=true, then select the texture at address1, if not, select the texture at address2), the addr holds either the value of address1 or address2. The result command is then used to load the appropriate texture (addr). In this way, commands can be executed serially (e.g., there are no branch or jump commands), and only one texture is loaded. Accordingly, the techniques of this disclosure allow control flow instructions having texture loads to be converted to predicate instructions without the drawbacks described above (e.g., multiple texture loads and the possibility of memory access violations).

In some examples, the compiler (such as compiler 92) may detect symmetric texture loads from both THEN and ELSE blocks, and only perform the optimization on the symmetric texture loads. For example, if a particular instruction only includes a texture load in one branch (e.g., if "x" then "y," else "load texture," where "y" is not a texture load), the conversion may not be performed, because such a conversion may not be needed. That is, in this example, there is only the potential for one texture load, so a conversion does not increase efficiency by eliminating a texture load.

The techniques of this disclosure can be used to "hoist" texture loads outside a control flow using predicated texture coordinates. That is, texture loads can be performed independently from other instructions (referred to as "hoisting"), because there are no jumps, branches, or other instructions that may influence the result of the texture loads. Accordingly, with no dependencies on other instructions, a compiler may schedule texture loads to be performed relatively early in the rendering process. In this way, textures may be ready when they are needed during rendering, rather than having to wait for textures to be loaded from memory (which may consume a relatively large number of clock cycles).

Figure 6:
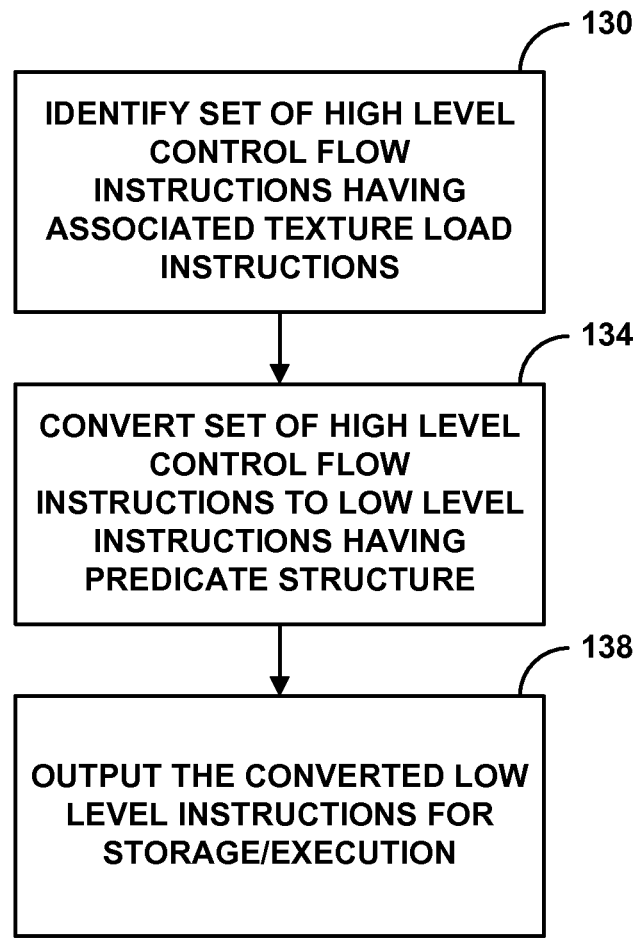
FIG. 6 is a flowchart illustrating example operation of a compiler in implementing various aspects of the techniques described in this disclosure.

FIG. 6 illustrates a method of converting a set of CF instructions having associated texture load instructions to instructions having a predicate structure, according to the techniques of this disclosure. While the method of FIG. 6 is described as being carried out by compiler 92 of computing device 70 (FIG. 2), it should be understood that the techniques of this disclosure may be carried out by a variety of other computing devices and compilers.

In the example of FIG. 6, compiler 92 identifies a set of HL CF instructions having associated texture load instructions (130). HL CF instructions may include, for example, a variety of conditional and/or loop instructions. Examples include if instructions, if-else instructions (if-then-else instructions), if-if instructions, or any other instruction by which the flow of execution of the instructions by the processor may be controlled (e.g., instructions that may control an instruction pointer register). The set of CF instructions identified by compiler 92 may include more than one branch (e.g., defining diverging paths), and each path of each branch may include one or more texture load instructions. Moreover, in some examples, the set of CF instructions may be a portion of a larger set of instructions, such as a subroutine.

After identifying the set of HL CF instructions having associated texture load instructions, compiler 92 converts the set of HL CF instructions to LL instructions having a predicate structure (134). That is, according to aspects of this disclosure, compiler 92 generates LL instructions having a predicate structure. Moreover, compiler 92 generates the LL instructions to limit the number of texture load instructions that are included in the LL instructions. For example, as described above, compiler 92 may generate instructions on texture coordinates, so that all of the texture load instructions of the HL CF instructions do not need to be included in the converted LL instructions.

According to aspects of this disclosure, compiler 92 may perform the conversion at run time, e.g., as a run-time compiler during execution of a program containing the HL CF instructions. Accordingly, compiler 92 may then output the converted LL instructions for execution (138). Compiler 92 may, however, also output the converted LL instructions for storage, for example, to a storage medium such as storage unit 76 (138).

It should be understood that, depending on the example, certain acts or events of the methods described herein, such as the method shown in FIG. 6, can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a computing device.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure.

By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Many aspects of the disclosure have been described. Various modifications may be made without departing from the scope of the claims. These and other aspects are within the scope of the following claims.

The invention claimed is:

1. A method of compiling high-level software instructions to generate low-level software instructions, the method comprising:
   identifying, with a computing device, a set of high-level (HL) control flow (CF) instructions having one or more associated texture load instructions, wherein execution of the one or more texture load instructions causes a texture to be loaded to memory and, wherein the set of HL CF instructions comprises one or more branches;
   determining whether the one or more associated texture load instructions are symmetric or approximately symmetric with respect to the number of texture load instructions associated with the one or more branches;
   based on the one or more texture load instructions being symmetric or approximately symmetric, converting, with the computing device, the identified set of HL CF instructions to low-level (LL) instructions having a predicate structure, wherein the LL instructions having the predicate structure are executable without branching;
   based on the texture load instructions not being symmetric or approximately symmetric, refraining from converting the identified set of HL CF instructions such that the HL CF instructions are unconverted; and
   outputting the converted LL instructions having the predicate structure or the unconverted set of HL CF instructions.

2. The method of claim 1, wherein execution of the one or more texture load instructions causes the texture to be transferred to a local memory of a graphics processing unit.

3. The method of claim 1, wherein converting the HL CF instructions comprises removing the one or more branches to allow unconditional serial execution of the converted low-level instructions.

4. The method of claim 1, wherein determining whether the one or more associated texture load instructions are symmetric or approximately symmetric comprises identifying an equal number of texture load instructions associated with each branch of the one or more branches.

5. The method of claim 1, wherein converting the identified set of HL CF instructions comprises generating a set of LL instructions, wherein execution of the set of LL instructions cause an address to be assigned based on an outcome of a selection function and a texture to be loaded from the assigned address.

6. The method of claim 1, wherein identifying the set of HL CF instructions comprises identifying an IF-ELSE statement having a condition, wherein if the condition is true, the set of HL CF instructions cause a texture to be loaded from a first memory address, and if the condition is false, the set of HL CF instructions cause the texture to be loaded from a second memory address.

7. The method of claim 6, wherein converting the set of HL CF instructions comprises generating a set of LL instructions, wherein the set of LL instructions cause an address to be reserved based on an outcome of the condition and the texture to be loaded from the reserved address.

8. The method of claim 1, wherein outputting the converted LL instructions comprises storing the converted LL instructions to memory.

9. The method of claim 1, wherein converting the HL instructions comprises run-time compiling the HL instructions to generate the LL instructions, and further comprising executing the outputted LL instructions on a graphics processing unit.

10. The method of claim 9, wherein executing the outputted LL instructions comprises scheduling the compiled instructions to be executed prior to instructions which a condition of the HL CF instructions and coordinates of the outputted LL instructions do not depend upon.

11. An apparatus for compiling high-level software instructions to generate low-level software instructions, the apparatus comprising one or more processing units, the one or more processing units configured to:
   identify a set of high-level (HL) control flow (CF) instructions having one or more associated texture load instructions, wherein execution of the one or more texture load instructions cause a texture to be loaded to memory and, wherein the set of HL CF instructions comprises one or more branches;
   determine whether the one or more associated texture load instructions are symmetric or approximately symmetric with respect to the number of texture load instructions associated with the one or more branches;
   based on the one or more texture load instructions being symmetric or approximately symmetric, convert the identified set of HL CF instructions to low-level (LL) instructions having a predicate structure, wherein the LL instructions having the predicate structure are executable without branching;
   based on the texture load instructions not being symmetric or approximately symmetric, refrain from converting the identified set of HL CF instructions such that the HL CF instructions are unconverted; and
   output the converted LL instructions having the predicate structure or the unconverted set of HL CF instructions.

12. The apparatus of claim 11, further comprising a local memory, wherein execution of the one or more texture load instructions causes the texture to be transferred to a local memory of the apparatus.

13. The apparatus of claim 11, wherein, to convert the HL CF instructions, the one or more processors are configured to remove the one or more branches to allow unconditional serial execution of the converted low-level instructions.

14. The apparatus of claim 11, wherein to determine whether the one or more associated texture load instructions are symmetric or approximately symmetric, the one or more processing units are configured to identify an equal number of texture load instructions associated with each branch of the one or more branches.

15. The apparatus of claim 11, wherein, to convert the identified set of HL CF instructions, the one or more processors are configured to generate a set of LL instructions, wherein execution of the set of LL instructions cause an address to be assigned based on an outcome of a selection function and a texture to be loaded from the assigned address.

16. The apparatus of claim 11, wherein, to identify the set of HL CF instructions, the one or more processors are configured to identify an IF-ELSE statement having a condition, wherein if the condition is true, the set of HL CF instructions cause a texture to be loaded from a first memory address, and if the condition is false, the set of HL CF instructions cause the texture to be loaded from a second memory address.

17. The apparatus of claim 16, wherein, to convert the set of HL CF instructions, the one or more processors are configured to generate a set of LL instructions, wherein the set of LL instructions cause an address to be reserved based on an outcome of the condition and the texture to be loaded from the reserved address.

18. The apparatus of claim 11, wherein, to output the converted LL instructions, the one or more processors are configured to store the converted LL instructions to memory.

19. The apparatus of claim 11, wherein, to convert the HL instructions, the one or more processors are configured to run-time compile the HL instructions to generate the LL instructions, and further comprising executing the outputted LL instructions.

20. The apparatus of claim 19, wherein, to execute the outputted LL instructions, the one or more processors are configured to schedule the compiled instructions to be executed prior to instructions which a condition of the HL CF instructions and coordinates of the outputted LL instructions do not depend upon.

21. A computer program product for compiling high-level software instructions to generate low-level software instructions, the computer program product storing instructions that, when executed, cause one or more processors to:
   identify a set of high-level (HL) control flow (CF) instructions having one or more associated texture load instructions, wherein execution of the one or more texture load instructions cause a texture to be loaded to memory and, wherein the set of HL CF instructions comprises one or more branches;
   determine whether the one or more associated texture load instructions are symmetric or approximately symmetric with respect to the number of texture load instructions associated with the one or more branches;
   based on the one or more texture load instructions being symmetric or approximately symmetric, convert the identified set of HL CF instructions to low-level (LL) instructions having a predicate structure, wherein the LL instructions having the predicate structure are executable without branching;
   based on the texture load instructions not being symmetric or approximately symmetric, refrain from converting the identified set of HL CF instructions such that the HL CF instructions are unconverted; and
   output the converted LL instructions having the predicate structure or the unconverted set of HL CF instructions.

22. The computer program product of claim 21, wherein execution of the one or more texture load instructions causes the texture to be transferred to a local memory of a graphics processing unit.

23. The computer program product of claim 21, wherein converting the HL CF instructions comprises removing the one or more branches to allow unconditional serial execution of the converted low-level instructions.

24. The computer program product of claim 21, wherein to determine whether the one or more associated texture load instructions are symmetric or approximately symmetric, the instructions cause the one or more processors to identify an equal number of texture load instructions associated with each branch of the one or more branches.

25. The computer program product of claim 21, wherein converting the identified set of HL CF instructions comprises generating a set of LL instructions, wherein execution of the set of LL instructions cause an address to be assigned based on an outcome of a selection function and a texture to be loaded from the assigned address.

26. The computer program product of claim 21, wherein identifying the set of HL CF instructions comprises identifying an IF-ELSE statement having a condition, wherein if the condition is true, the set of HL CF instructions cause a texture to be loaded from a first memory address, and if the condition is false, the set of HL CF instructions cause the texture to be loaded from a second memory address.

27. The computer program product of claim 26, wherein converting the set of HL CF instructions comprises generating a set of LL instructions, wherein the set of LL instructions cause an address to be reserved based on an outcome of the condition and the texture to be loaded from the reserved address.

28. The computer program product of claim 21, wherein outputting the converted LL instructions comprises storing the converted LL instructions to memory.

29. The computer program product of claim 21, wherein converting the HL instructions comprises run-time compiling the HL instructions to generate the LL instructions, and further comprising instructions that, when executed, cause the one or more processors to execute the outputted LL instructions on a graphics processing unit.

30. The computer program product of claim 29, wherein executing the outputted LL instructions comprises scheduling the compiled instructions to be executed prior to instructions which a condition of the HL CF instructions and coordinates of the outputted LL instructions do not depend upon.

31. An apparatus for compiling high-level software instructions to generate low-level software instructions, the apparatus comprising:
means for identifying a set of high-level (HL) control flow (CF) instructions having one or more associated texture load instructions, wherein execution of the one or more texture load instructions cause a texture to be loaded to memory and, wherein the set of HL CF instructions comprises one or more branches;
means for determining whether the one or more associated texture load instructions are symmetric or approximately symmetric with respect to the number of texture load instructions associated with the one or more branches;
based on the one or more texture load instructions being symmetric or approximately symmetric, means for converting the identified set of HL CF instructions to low-level (LL) instructions having a predicate structure, wherein the LL instructions having the predicate structure are executable without branching;
based on the texture load instructions not being symmetric or approximately symmetric, means for refraining from converting the identified set of HL CF instructions such that the HL CF instructions are unconverted; and
means for outputting the converted LL instructions having the predicate structure or the unconverted set of HL CF instructions.

32. The apparatus of claim 31, wherein execution of the one or more texture load instructions causes the texture to be transferred to a local memory of a graphics processing unit.

33. The apparatus of claim 31, wherein the means for converting the HL CF instructions comprises means for removing the one or more branches to allow unconditional serial execution of the converted low-level instructions.

34. The apparatus of claim 31, wherein the means for determining whether the one or more associated texture load instructions are symmetric or approximately symmetric comprises means for identifying an equal number of texture load instructions associated with each branch of the one or more branches.

35. The apparatus of claim 31, wherein the means for converting the identified set of HL CF instructions comprises means for generating a set of LL instructions, wherein execution of the set of LL instructions cause an address to be assigned based on an outcome of a selection function and a texture to be loaded from the assigned address.

36. The apparatus of claim 31, wherein the means for identifying the set of HL CF instructions comprises means for identifying an IF-ELSE statement having a condition, wherein if the condition is true, the set of HL CF instructions cause a texture to be loaded from a first memory address, and if the condition is false, the set of HL CF instructions cause the texture to be loaded from a second memory address.

37. The apparatus of claim 36, wherein the means for converting the set of HL CF instructions comprises means for generating a set of LL instructions, wherein the set of LL instructions cause an address to be reserved based on an outcome of the condition and the texture to be loaded from the reserved address.

38. The apparatus of claim 31, wherein the means for outputting the converted LL instructions comprises means for storing the converted LL instructions to memory.

39. The apparatus of claim 31, wherein the means for converting the HL instructions comprises means for run-time compiling the HL instructions to generate the LL instructions, and further comprising executing the outputted LL instructions on a graphics processing unit.

40. The apparatus of claim 39, wherein the means for executing the outputted LL instructions comprises means for scheduling the compiled instructions to be executed prior to instructions which a condition of the HL CF instructions and coordinates of the outputted LL instructions do not depend upon.

* * * * *